United States Patent
Freudelsperger

(10) Patent No.: US 6,648,121 B2
(45) Date of Patent: Nov. 18, 2003

(54) DEVIATING DEVICE FOR A CONVEYOR

(75) Inventor: Karl Freudelsperger, Hart bei Graz (AT)

(73) Assignee: Knapp Logistik Automation GmbH, Hart bei Graz (AT)

( * ) Notice: Subject to any disclaimer, the term of this patent is extended or adjusted under 35 U.S.C. 154(b) by 0 days.

(21) Appl. No.: 10/030,545
(22) PCT Filed: Jul. 10, 2001
(86) PCT No.: PCT/AT00/00190
 § 371 (c)(1),
 (2), (4) Date: May 8, 2002
(87) PCT Pub. No.: WO01/05688
 PCT Pub. Date: Jan. 25, 2001

(65) Prior Publication Data
 US 2002/0153226 A1 Oct. 24, 2002

(30) Foreign Application Priority Data
 Jul. 14, 1999 (AT) .............................. 1221/99

(51) Int. Cl.⁷ .......................... B65G 47/54; B65G 13/11
(52) U.S. Cl. ............................ 198/370.09; 198/463.3
(58) Field of Search ................... 198/370.09, 463.3

(56) References Cited

U.S. PATENT DOCUMENTS

| | | | |
|---|---|---|---|
| 3,680,677 A | * 8/1972 | Branch et al. ............. | 198/20 |
| 4,747,477 A | 5/1988 | Benz et al. | |
| 4,962,841 A | * 10/1990 | Kloosterhouse ............ | 198/372 |
| 5,029,693 A | * 7/1991 | Williams .................... | 198/372 |
| 5,609,236 A | * 3/1997 | Neukam ................. | 198/370.01 |
| 5,971,133 A | * 10/1999 | Wilkins .................. | 198/370.09 |
| 6,073,747 A | * 6/2000 | Takino et al. .......... | 198/370.09 |
| 6,085,892 A | * 7/2000 | Lem et al. ............... | 198/370.09 |
| 6,223,880 B1 | * 5/2001 | Caspi et al. ............. | 198/346.2 |
| 6,343,685 B1 | * 2/2002 | Hofer ...................... | 198/370.09 |
| 6,382,393 B2 | * 5/2002 | Itoh et al. ................ | 198/370.09 |
| 6,464,064 B1 | * 10/2002 | Rieg et al. .............. | 198/370.09 |
| 6,505,733 B2 | * 1/2003 | Troupos et al. ............. | 198/809 |

FOREIGN PATENT DOCUMENTS

| | | |
|---|---|---|
| DE | 198 00 549 A | 7/1999 |
| DE | 299 08 236 U | 9/1999 |
| EP | 0 251 391 A | 1/1988 |
| EP | 0 463 878 A | 1/1992 |
| FR | 2 310 942 A | 12/1976 |
| WO | WO 98 50297 A | 11/1998 |

OTHER PUBLICATIONS

International Search Report for PCT/A 00/00190 dated Oct. 20, 2000.
Patent Abstracts of Japan, vol. 008, No. 128 (M–302) (Jun. 14, 1984) & JP 59 031211 A (Feb. 20, 1984).
Patent Abstracts of Japan, vol. 005, No. 068 (M–067) (May 8, 1981) & JP 56 018163 A (Feb. 20, 1981).

* cited by examiner

Primary Examiner—Douglas Hess
(74) Attorney, Agent, or Firm—Sughrue Mion, PLLC

(57) ABSTRACT

A deviation device for a conveyor which defines a conveying plane (22), e.g. a driving roller path (23), for deviating conveyed goods, e.g. containers, comprising a row of rollers (7) arranged on a separate carrier (5) common to them, the carrier being arranged in a frame (3) so as to be adjustable in height therein, the rollers having an associated driving roller (4) in common, characterized in that the frame (3) accommodating the carrier (5) is a separate module frame of a deviation module element (1; 1') in which the driving roller (4) is mounted below the carrier (5) with the rollers (7), and in which, preferably, furthermore a basic carrier (3B) is fixed between the roller carrier (5) and the driving roller (2), which basic carrier carries a lifting drive (2) for the roller carrier (5).

24 Claims, 11 Drawing Sheets

DEVIATING DEVICE FOR A CONVEYOR

The invention relates to a deviation device for a conveyor which defines a conveying plane, e.g. a driving roller path, for deviating goods to be conveyed, e.g. containers.

Deviation devices for driving roller paths serve e.g. to deviate certain conveyed goods from a flow of conveyed goods into a certain direction and to transfer them to a different conveying path. Both, shunts comprising rollers, in which the rollers are pivoted about vertical axes to change the direction, and shunts in which rollers positioned inclinedly relative to the conveying direction are lifted to above the level of the conveying plane when the deviation means is activated so as to cause a deviation of the conveyed goods are known.

From DE 1 297 022 B, a shunt comprising a path of rollers for items, containers or the like, using pivotable or liftable driven frictional rollers is known. There, it is also provided to attach a series of frictional rollers via bearing pedestals on a common carrier which is guided on a basic frame of the conveying device so as to be adjustable in height by means of guiding pins. For the height adjustment of the carrier, a shaft is mounted with cams on the basic frame of the conveying device. What is disadvantageous is that it is hardly possible to equip already existing conveying devices later on or to adapt them to certain uses, since the individual components are individually attached to the basic frame of the conveying device and have to be adjusted relative to one another.

It is an object of the invention to provide a deviation device of the initially defined type, which is versatile and flexible in terms of its possible fields of use and thus is not only usable for one certain task, but which may be integrated in the driving roller path or the like, depending on the respective requirements. Also an installation into already existing conveying systems is to be feasible without any problems, as well as its use for deviating conveyed goods of different lengths, or widths, respectively. Moreover, pushing or deviating goods to a transporting means branching off the original conveying path, realization of curves and turns, a turning of the conveyed item about its vertical axis and also a deviation on the original conveying path towards a certain longitudinal side shall be possible.

The deviation module element provided according to the invention comprising a separate module frame and a separate carrier thus may be prepared as an autonomous construction unit and may subsequently be integrated upon requirement in an advantageous manner with great flexibility at any desired site of a conveying or driving roller path, respectively. Moreover, any desired number of such deviation module elements may be provided in succession in a conveying, or driving roller path, respectively. Such an installation at any sites desired is particularly possible if the conveying means is a driving roller path, since a deviation module element then may be installed in each case in the space between two driving rollers; for this purpose it may simply be screwed with its module frame to the basic frame of the driving roller path at pre-determined sites thereof, possibly it may even be fixed by means of suspension or snap connections. Advantageously, the number of the installed deviation module elements may be appropriately adapted to the length, or width, respectively, of the conveyed goods to be deviated. In the case of conveyor belts, an installation at a site between two successive conveyor belts is possible.

To lift the deviation module element in a simple manner temporarily above the conveying plane of the conveyor and to thus allow for certain goods to be deliberately deviated from the conveying paths with the assistance of the deviation module element, it is advantageous if a basic carrier carrying a lifting drive for the roller carriers is fixed between the roller carrier and the driving roller.

Each deviation module element may advantageously be independent of the remaining module elements in the driving roller path, also as regards its control. For lifting, or lowering, respectively, of the carrier with the row of rollers, preferably a lifting cylinder is provided which is fastened to the basic carrier that is fixed to the module frame.

The rollers preferably are rotatably driven via round belts that are driven via driving rollers rotatably mounted in the module frame. The driving roller may be designed as a bead roller so as to guide the respective round belt while the latter is running on the driving roller and so as to enhance its skid safety.

With a view to a simple, low-cost construction of the deviation module element, advantageously a driving belt is provided for the drive of the driving roller which driving belt also drives the driving rollers of the driving roller path. In this case, also tensioning or deflection pulleys may be arranged between the driving rollers so as to attain the required looping angles.

For a simple construction and a reliable drive, it is advantageous if a flat belt is provided as the driving belt.

The rollers advantageously are provided with an O-ring on their peripheries; the O-rings get into contact with the conveyed goods so as to achieve the desired deviating effect, sufficient friction being ensured.

The driving rollers neighbouring the deviation module element preferably are bead rollers driven via round belts. If the driving belt drives the driving rollers of the deviation module elements at those sides of the driving roller path where the deviation module elements are integrated, it is suitable to provide special bead rollers for the carrying rollers of the driving roller path at those sites—which are not driven via the driving belt itself, because the latter runs over the driving rollers of the deviation module element—the required torque being transmitted to these bead rollers by those carrying rollers arranged most closely to the deviation module element(s), which are still driven by the flat belt, via the round belts.

The end positions of the carrier of the deviation module element are defined by adjustable stops connected with the module element frame. Thus, it is possible in a simple manner, to preferably adjust the carrier at its final height manually, without actuating the lifting drive, in such a way that the rollers, or the O-rings, respectively, in the lifted state of the carrier will project to the desired extent over the conveying plane defined, e.g., by the carrying rollers.

Due to the advantageous module-type mode of construction of the deviation device it is also possible to provide several deviation module elements with carriers each attached in its separate module frame so as to be independently vertically adjustable; in this manner, the respective size of the conveyed goods to be deviated can be taken into account without any problems, and it is also possible to obtain a suitable control of the entire deviation device. For this purpose, the or each deviation module element can have an associated trigger light barrier for controlling the lifting drive of the carrier; in this manner, e.g., it will be possible to lift all the carriers of the deviation module elements simultaneously and to thus deviate the conveyed goods. Yet to increase the throughput, it is also conceivable to control one deviation module element after the other, in a temporally offset manner. To simplify the control circuit, however, it is also possible to provide merely one common trigger light barrier for an optionally temporally successive control of the lifting drives of the carriers of several deviation module elements. With this design, thus, the deviation module elements will be controlled in groups by the common trigger light barrier which senses the arrival of the conveyed goods to be deviated. It is also conceivable to control several deviation module elements in a pre-selected sequence with one common trigger light barrier, with a temporal delay corresponding to the speed of the conveyed goods.

Furthermore, it is suitable if the rollers are arranged on the carrier so as to be rotatable about axes extending perpendicularly to their axes of rotation, whereby they are (fixedly) adjustable under adjustable angles. Therefore, also several module elements may be successively integrated in the driving roller paths, the module elements each having a different angle of deflection. Thus, in case of great deviations, the angles of deviation can advantageously be successively increased, starting from positions with very slight inclinations, so as to achieve a gentle mode of deviating the conveyed goods.

The angle of the rollers relative to the conveying direction may be approximately 35° in a normal operating position. This angle has proven particularly suitable for a shunting function.

The deviation device may be used for shifting, i.e. for introducing or moving out the conveyed goods via a conveying path that extends under an inclination to the driving roller path.

Likewise, in case of different deflection angles, the deviation device may be used for transferring the conveyed goods onto a roller path extending in parallel to the original driving roller path.

Moreover, the deviation device may also be used for moving away the conveyed goods or introducing them in a direction extending substantially at right angles to the conveying direction of the driving roller path.

Often it is also necessary to convey the conveyed goods to a certain longitudinal side of the driving roller path, e.g. so as to read the bar code. The deviation device according to the invention may advantageously be used for shifting the conveyed goods towards a certain longitudinal side of the driving roller path. In this case, advantageously also a stop device may be provided on the longitudinal side towards which the conveyed goods are shifted.

For a simple construction and a safe stop over a certain length it is suitable if a rail is provided as the stop device.

A further advantageous application of the module-type deviation device consists in the formation of a curve region as a transition between two conveying paths arranged under an angle relative to each other. To meet the requirements often occurring in practice, it is also advantageous if the conveying paths are arranged rotated by 90°, or 180°, respectively, relative to each other.

It is also suitable to use the module-type deviation device for turning the conveyed goods by 180° about their vertical axes, whereby a deviation module element is arranged between two parallel conveying paths with its carrier extending in parallel to the main conveying direction.

In the following, the invention will be explained in more detail by way of preferred exemplary embodiments illustrated in the drawings to which, however, it shall not be restricted. In detail, in the drawings, FIG. 1 shows a deviation module element;

Figure 1:
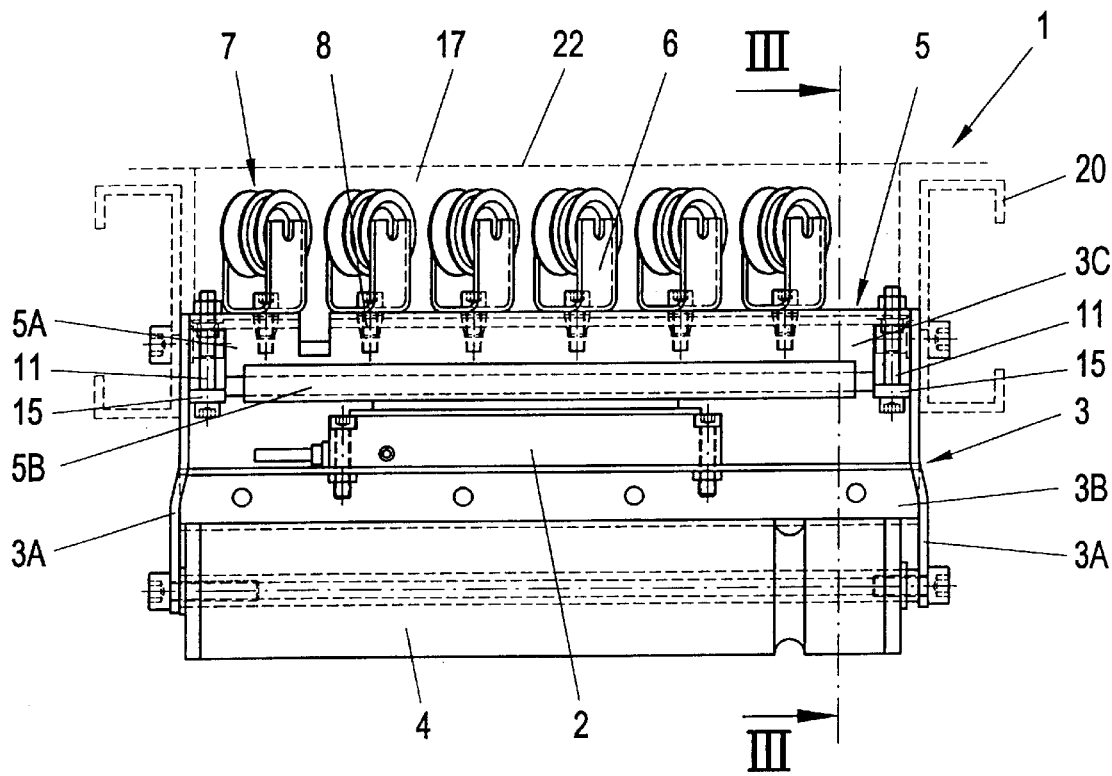
Figure 10:
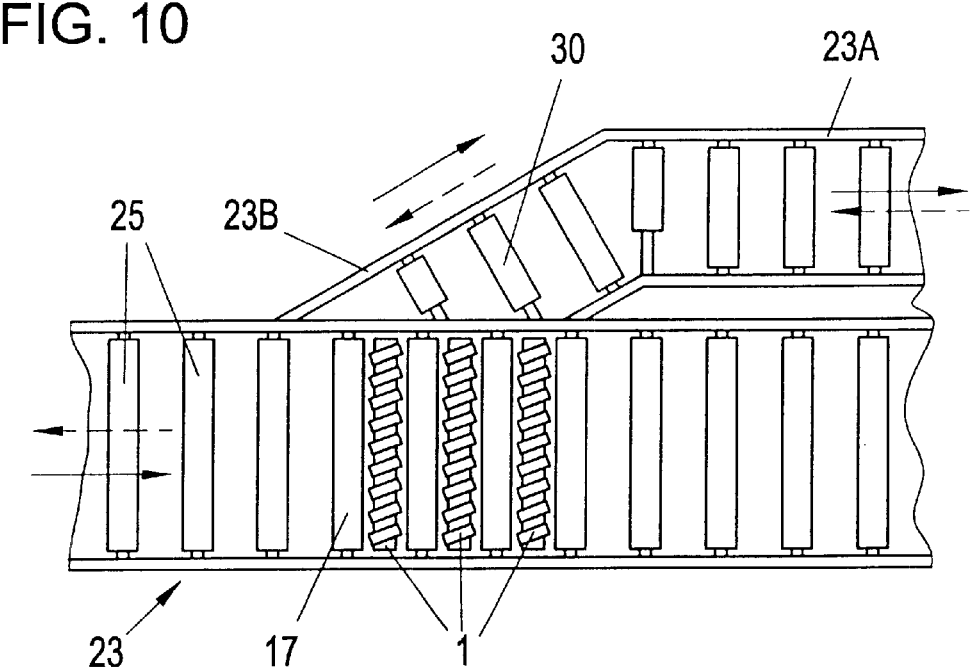
Figure 11:
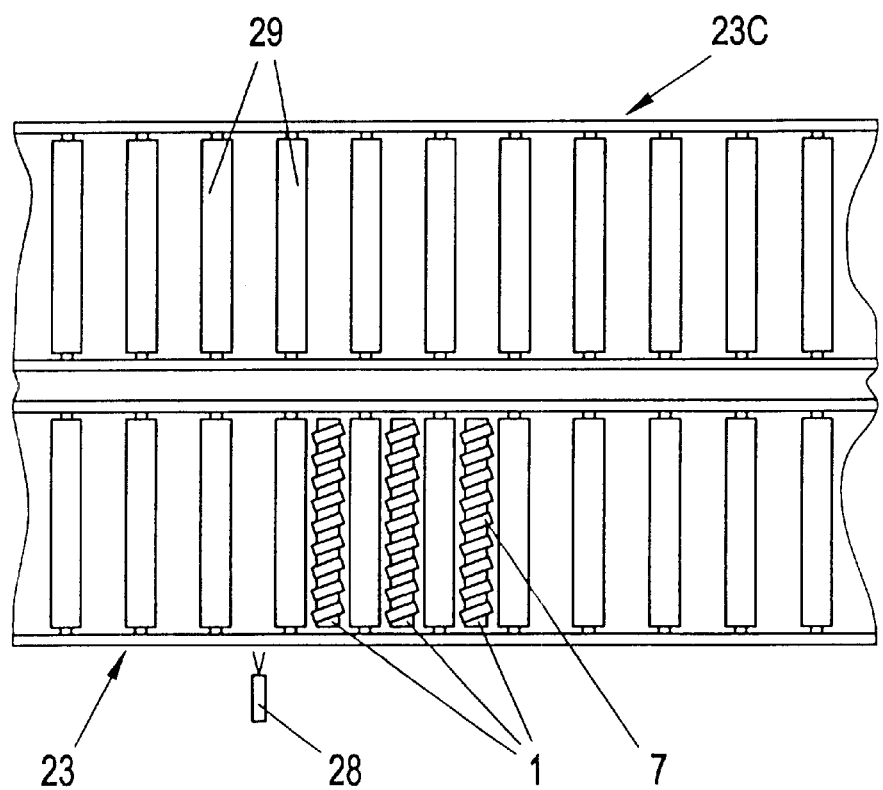
Figure 12:
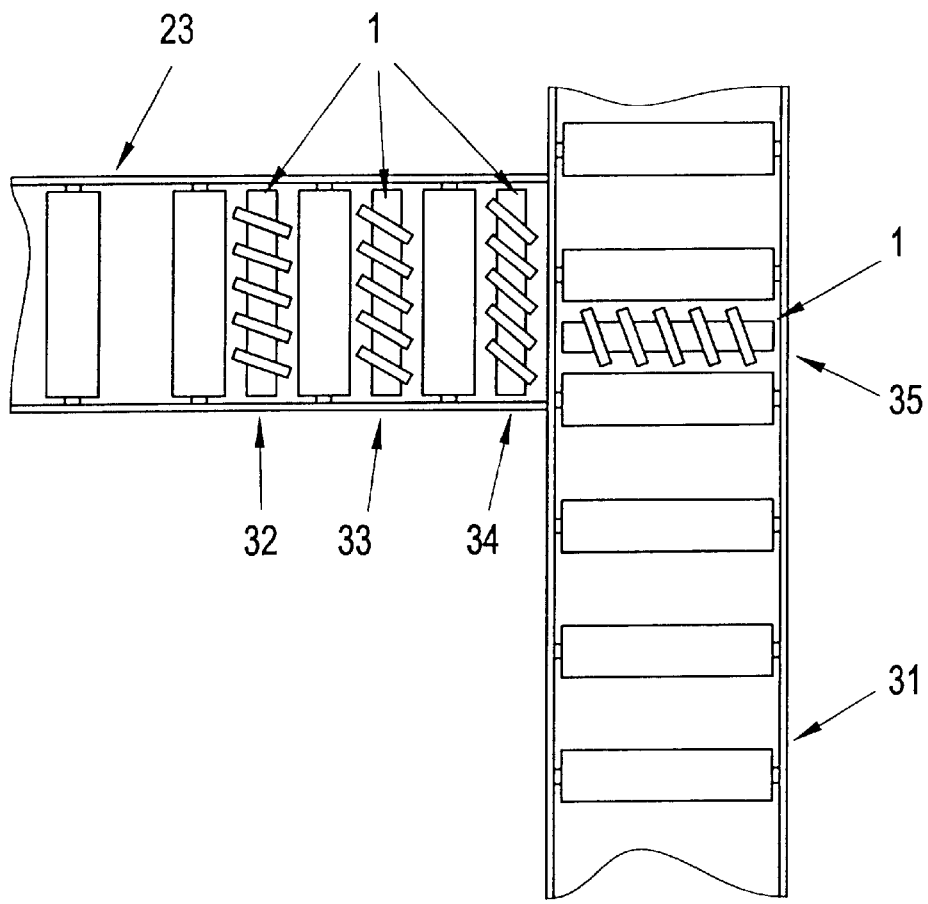
Figure 13:
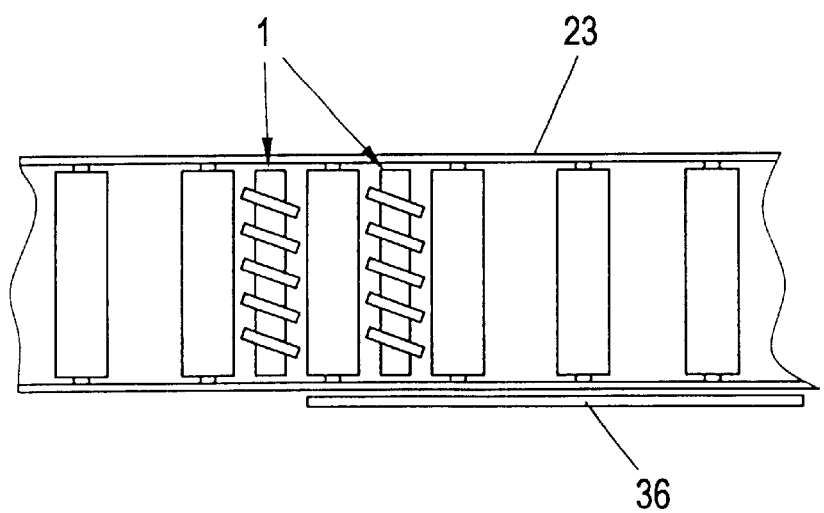
Figure 14:
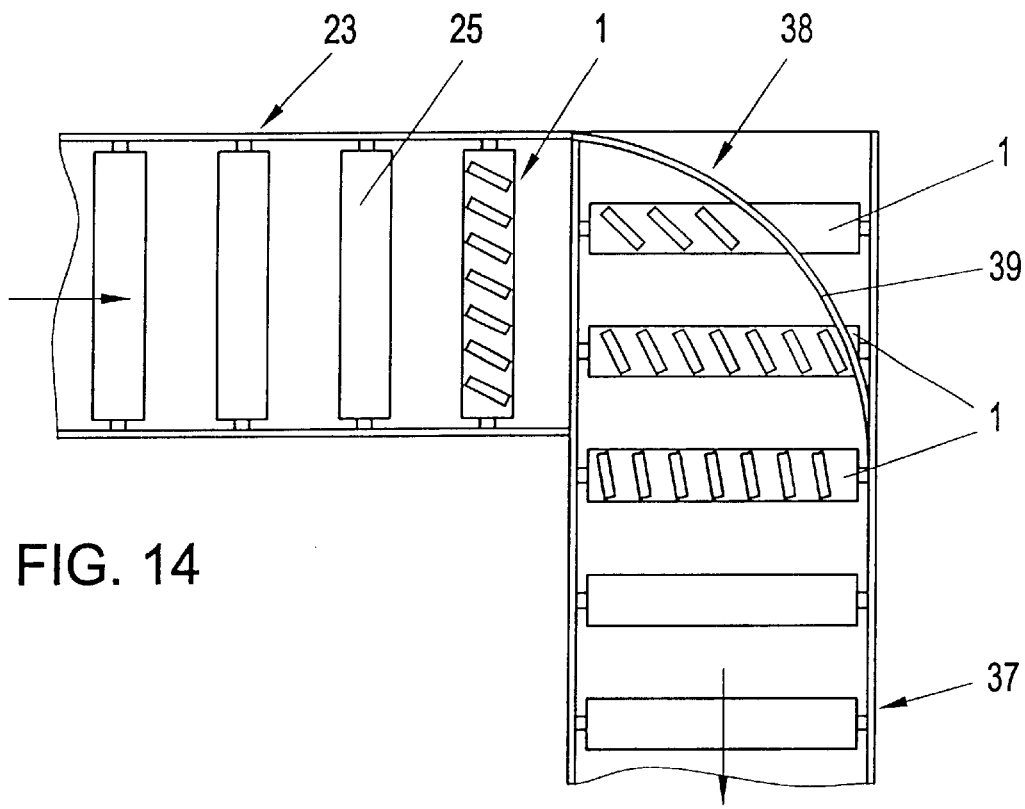
Figure 15:
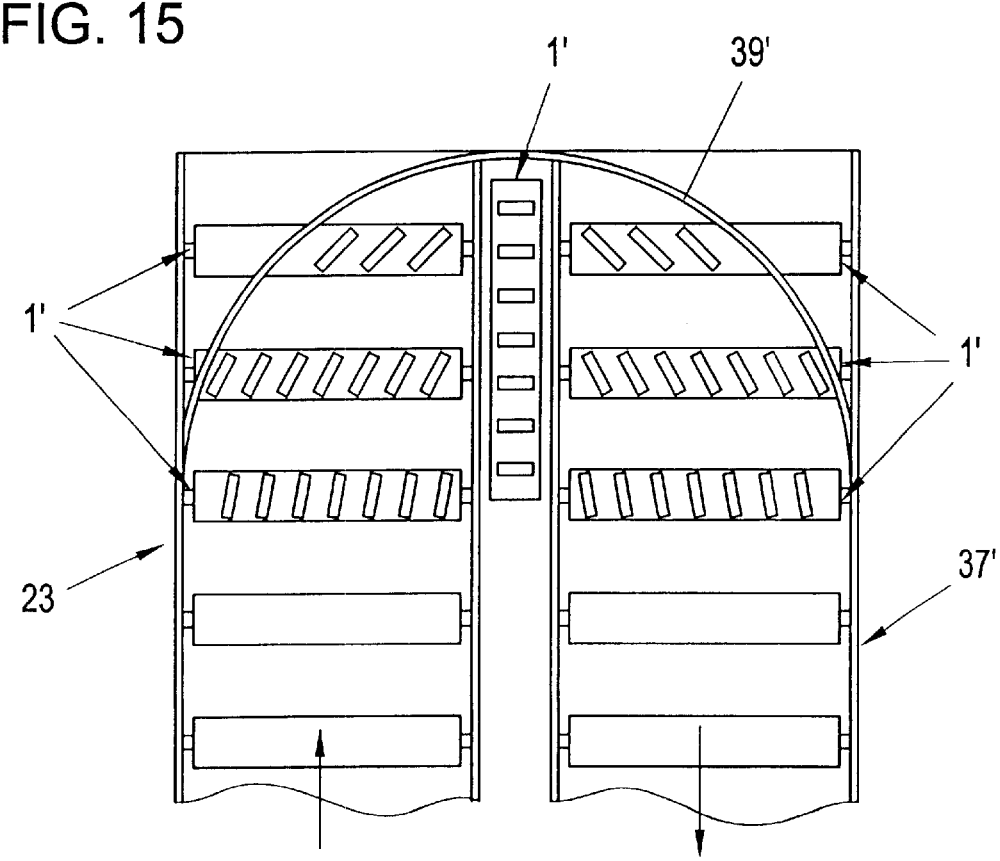
Figure 16:
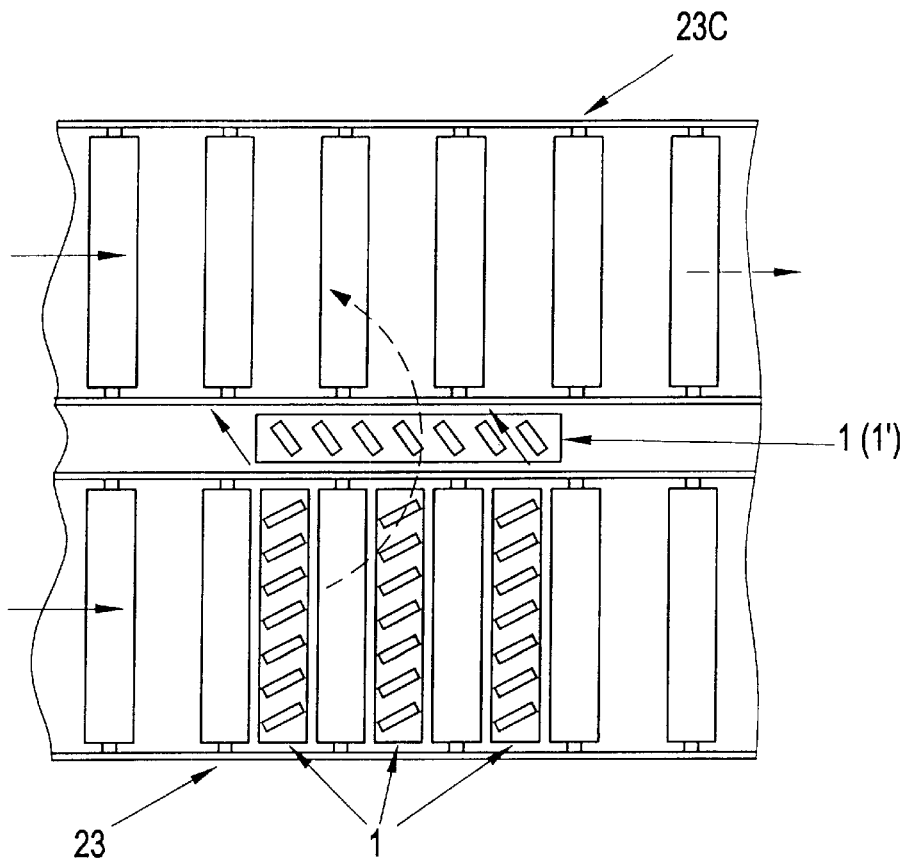
Figure 17:
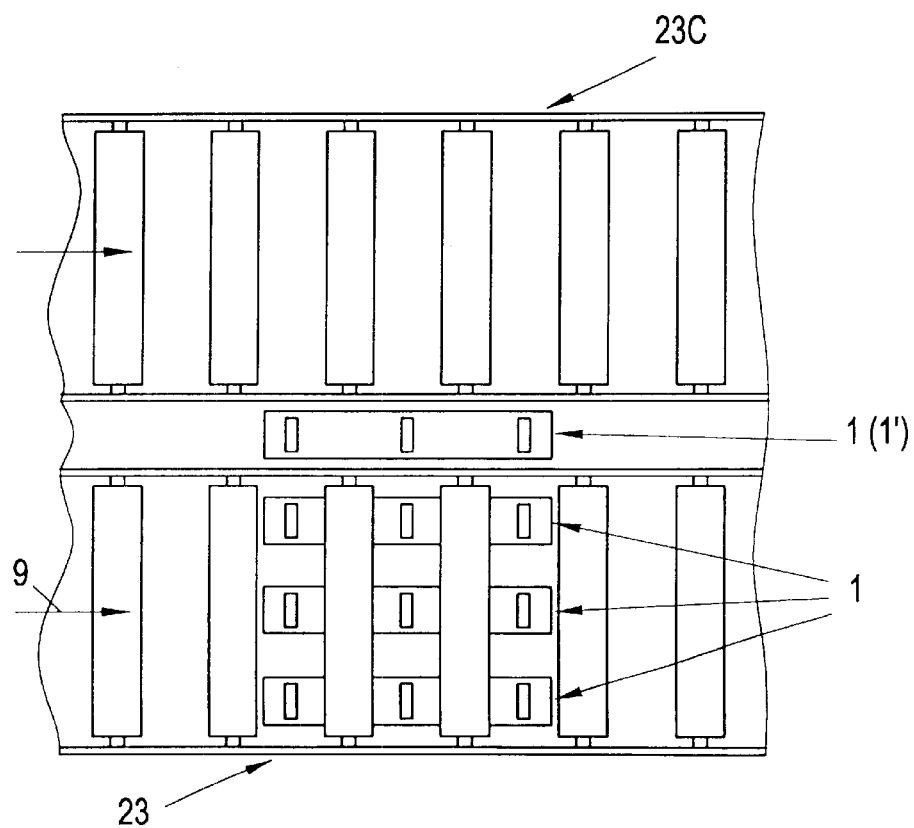
Figure 18:
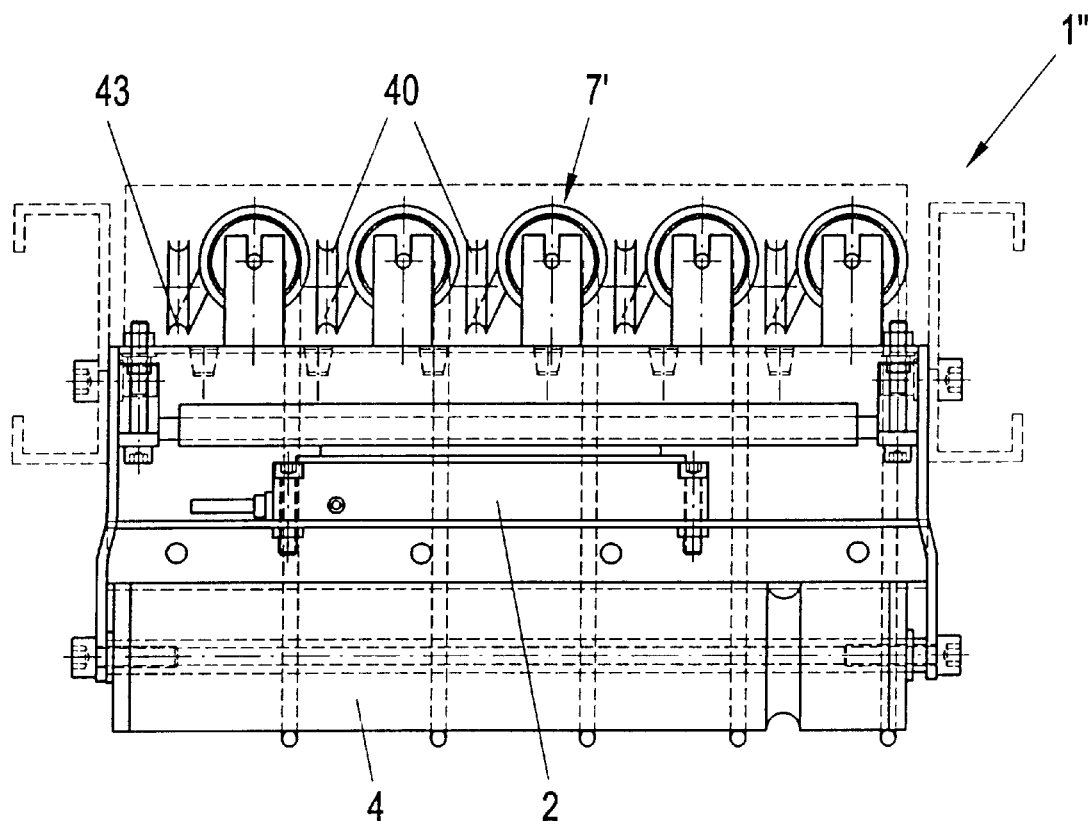
Figure 19:
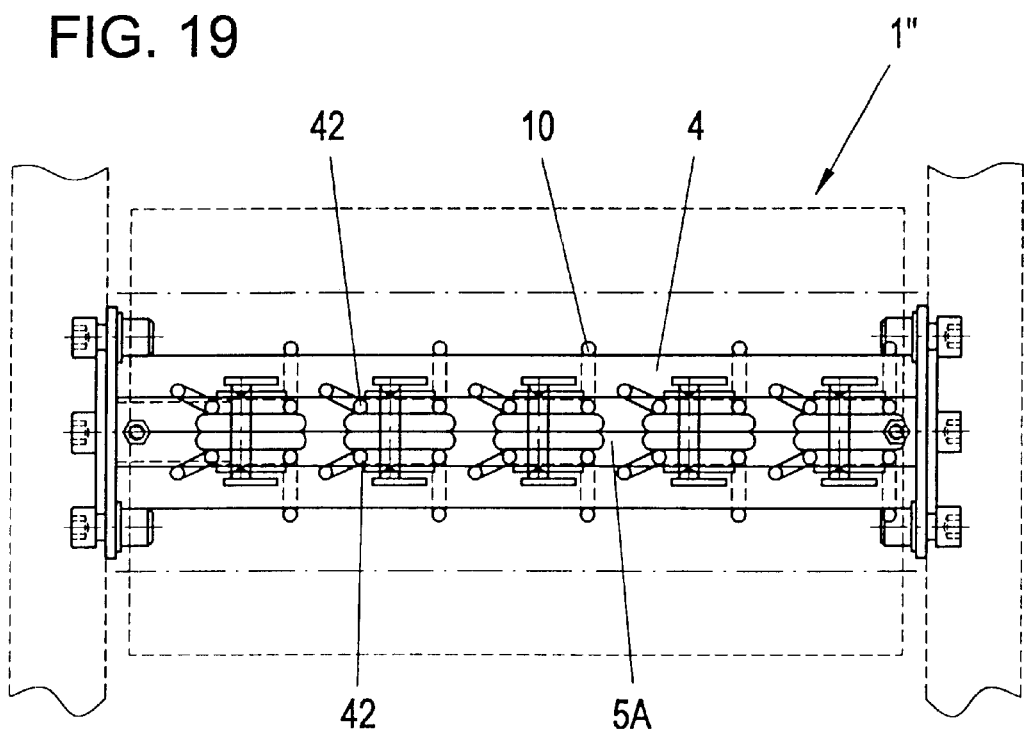
Figure 20:
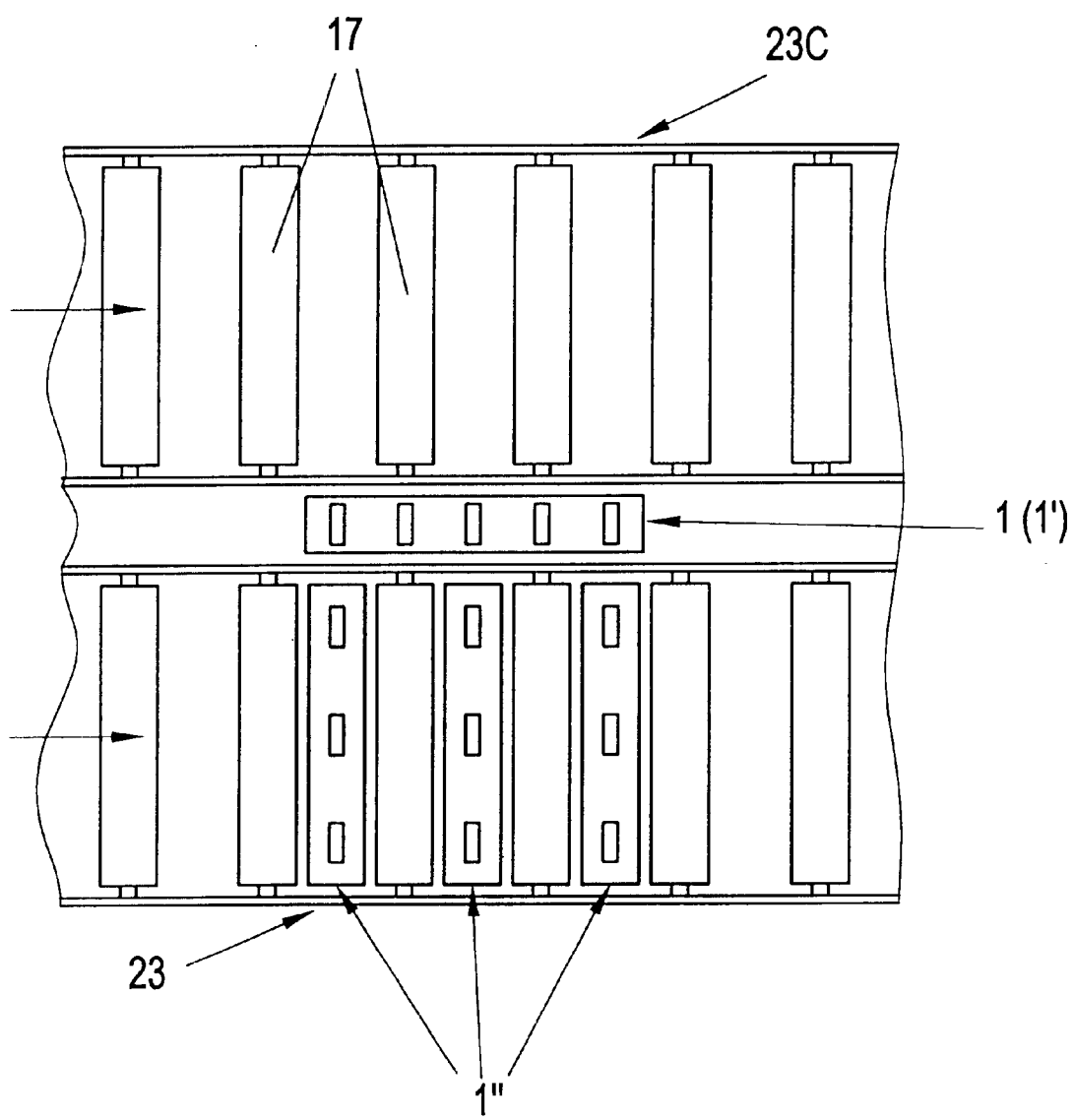

FIG. 10 schematically shows in a top view the use of deviation module elements at a transfer of conveyed goods via a path inclined by about 30° relative to the conveying direction;

FIG. 11 schematically shows in a top view the use of deviation module elements at the transfer of conveyed goods to a parallel conveying path;

FIG. 12 schematically shows in a top view the use of deviation module elements for deviating the conveyed goods by 90°;

FIG. 13 schematically shows in a top view the use of deviation module elements for shifting conveyed goods towards a certain longitudinal side of the driving roller path;

FIG. 14 schematically shows in a top view the use of deviation module elements for realizing a 90° curve for the conveyed goods;

FIG. 15 schematically shows in a top view the use of deviation module elements for realizing a 180° turn, with the conveyed goods being transferred to a path conveying parallelly in the opposite direction;

FIG. 16 schematically shows in a top view the use of deviation module elements including a deviation module element provided length-wise between two conveying paths, for turning conveyed goods by 180° and transferring it to a parallel conveying path;

FIG. 17 schematically shows in a top view the use of longitudinally installed deviation module elements including one module element longitudinally installed between two conveying paths when transferring conveyed goods under 90° to a parallel conveying path;

FIG. 18 is a view similar to FIG. 1, of a deviation module element comprising additional deviation rollers for the round belts;

FIG. 19 is a top view onto the deviation module element according to FIG. 18; and FIG. 20 schematically shows in a top view the use of deviation module elements installed in parallel to the carrying rollers, including a module element longitudinally installed between two conveying paths, at the transfer of conveyed goods under 90° to a parallel conveying path.

Figure 2:
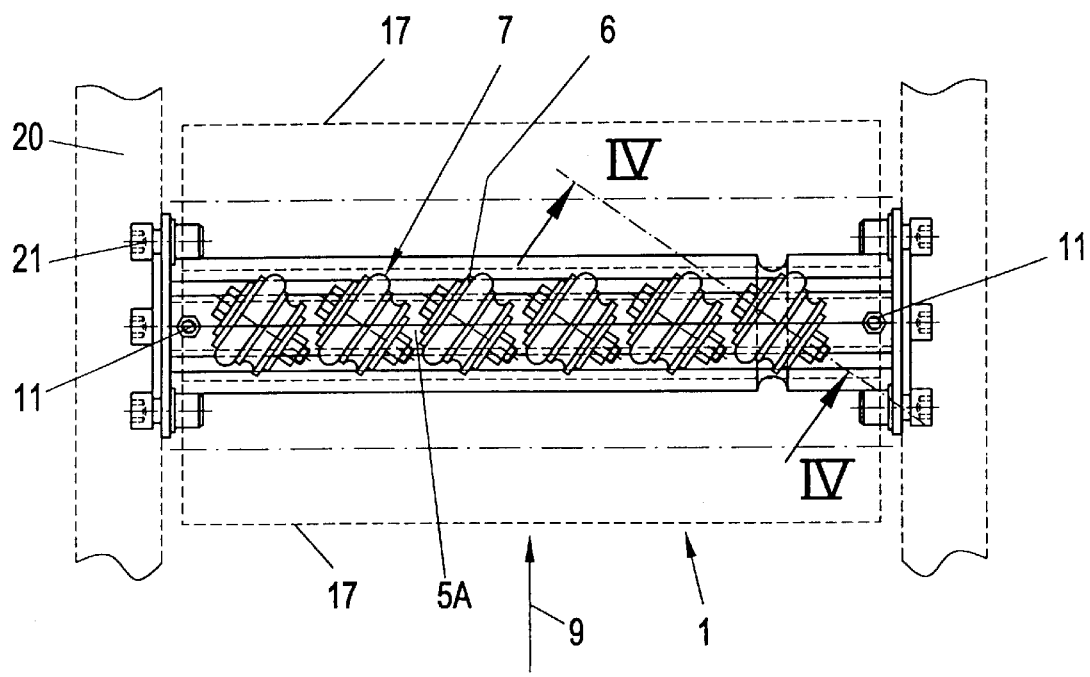
FIG. 2 is a top view onto this deviation module element.

In FIGS. 1 and 2, a deviation device having the form of a deviation module element 1 comprising a lifting drive 2 is illustrated in a (front) view, and in a top view, respectively. The (or each, respectively) deviation module element 1 has a separate module frame 3 in which a driving roller 4 is rotatably mounted. In the exemplary embodiment illustrated, the module frame 3 substantially has two side parts 3A, a basic carrier 3B, and an upper cross-member 3C, cf. FIG. 3 in addition to FIG. 1. On the cross-member 3C, a vertically movable carrier 5 is seated which consists of two U-sections 5A, 5B movable in each other, the lower U-section 5A in its lowermost position being capable of sitting on the top cross-member 3C of the module frame 3. On the upper U-section 5A, holding means 6 for rollers 7 are attached via vertical screws or bolts 8 so that they may be adjusted individually in their inclined positions relative to the conveying direction (which, according to the illustration of FIG. 1, extends perpendicular to the plane of drawing, cf. also arrow 9 in FIG. 2).

With an appropriate control via the main drive 2, e.g. a lifting cylinder, the carrier 5 can be lifted and lowered, and thus, changed in its height position relative to the frame 3. The control of the lifting drive 2 is, e.g., effected in a manner known per se via a pressurized air unit comprising a pressurized air reservoir and valves, not illustrated in detail.

The rollers 7 are driven via round belts 10 (not illustrated in FIGS. 1 and 2, yet cf. FIG. 4), resting skid-proof both on the driving roller 4, and in grooves of the rollers 7. For an improved guiding of the round belts 10, grooves or beads (not illustrated) may also be provided in the driving roller 4.

In FIG. 2, the deviation module element 1 is shown in top view. Here the inclined position of the holding means 6, in which the rollers 7 are mounted so as to be freely rotatable, under an angle of approximately 35° relative to the conveying direction 9 is visible.

The end position of the carrier 5 in the lifted state can be defined with the assistance of lateral adjustment screws 11.

Figure 3:
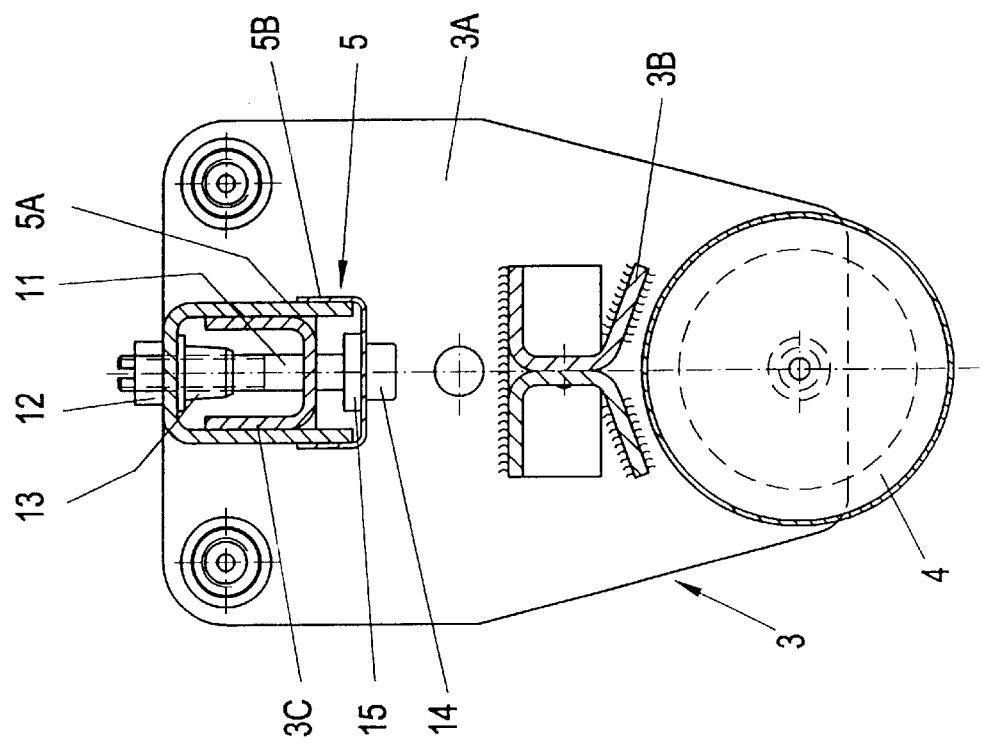
FIG. 3 is a cross-section according to line III—III of FIG. 1.

FIG. 3 shows a cross-section according to sectional line III—III of FIG. 1. It can be seen that the basic carrier 3B is fixedly connected to the side parts 3A of the module frame 3 by welding seams. The uppermost position of the upper carrier section 5A is defined by the screws 11 which accommodate the upper carrier section 5A between two nuts 12, 13, the screws 11 being guided through openings in projections 15 (cf. FIG. 1) fixed to the side parts 3A, whereby the screw heads 14 in an uppermost position abut on the projections 15, thus causing a limitation in terms of height. The lowermost position is defined by the uppermost carrier section 5A resting against the uppermost cross-member 3C.

Figure 4:
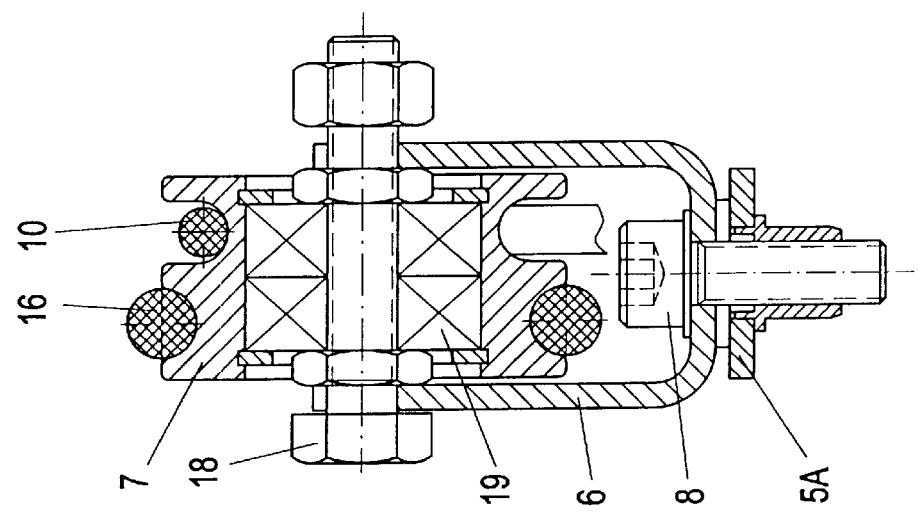
FIG. 4 is a sectional representation of a roller including its holding means according to line IV—IV of FIG. 2.

FIG. 4 shows a sectional representation of a roller 7 according to the section line IV—IV of FIG. 2. The rollers 7 comprise O-rings 16 fixed in grooves, and in the lifted state of the carrier 5, the rollers 7 project with their O-rings beyond the level defined by the carrying rollers 17 of an associated driving roller path (merely represented by broken lines in FIGS. 1 and 2, yet cf. also FIGS. 8 and 9), and in the lowered state of the carrier 5, they come to lie below the level thereof so that in that position they do not get into contact with the conveyed goods. The rollers 7 are driven via the afore-mentioned round belts 10, and they are mounted in the holding means 6 on horizontally arranged axle pins 18 by means of bearings 19. Moreover, it is visible in FIG. 4 that the holding means 6 for the rollers 7 are formed to be yoke-shaped, wherein the afore-mentioned bolt 8 passes through a hole in their base portion and is fixed on the web portion of the upper carrier section 5A. The fixation may be such that the holding means 6 is fixedly adjusted relative to the upper carrier section 5A at a pre-determined angle, whereupon the bolt 8 is tightened so that the adjusted inclined position of the rollers 7 relative to the conveying direction 9 will remain unchanged thereafter. When the conveying direction is changed, or in case of different deviation requirements, the inclined position of the rollers 7 can be changed accordingly with the assistance of the releasable bolt fastening 8.

The deviation module element 1 described may be fixed in a simple manner by tightly screwing its own module frame 3 into a basic frame 20 of the associated conveyor, a fine adjustment being possible with a view to the possibility of adjusting the lifting of the row of rollers with the assistance of the bolts 11 and nuts 12, 13. In FIGS. 1 and 2, respective bolts 21 for fastening the module frame 3 on the basic frame 20 are illustrated. The basic frame 20 of the conveyor, e.g. a driving roller path, is merely represented in broken lines, since it is not part of the deviation module element 1.

Figure 5:
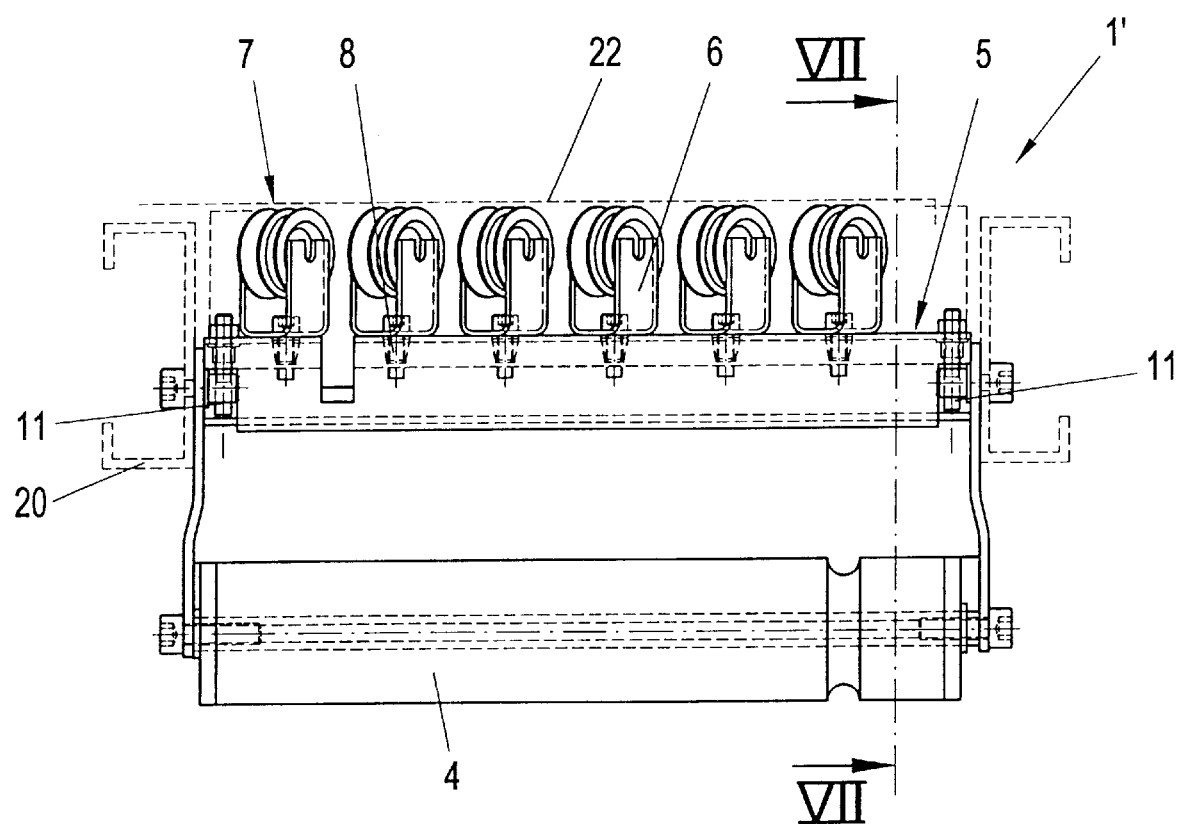
FIG. 5 is a view similar to FIG. 1 of a deviation module element without a lifting drive.
Figure 6:
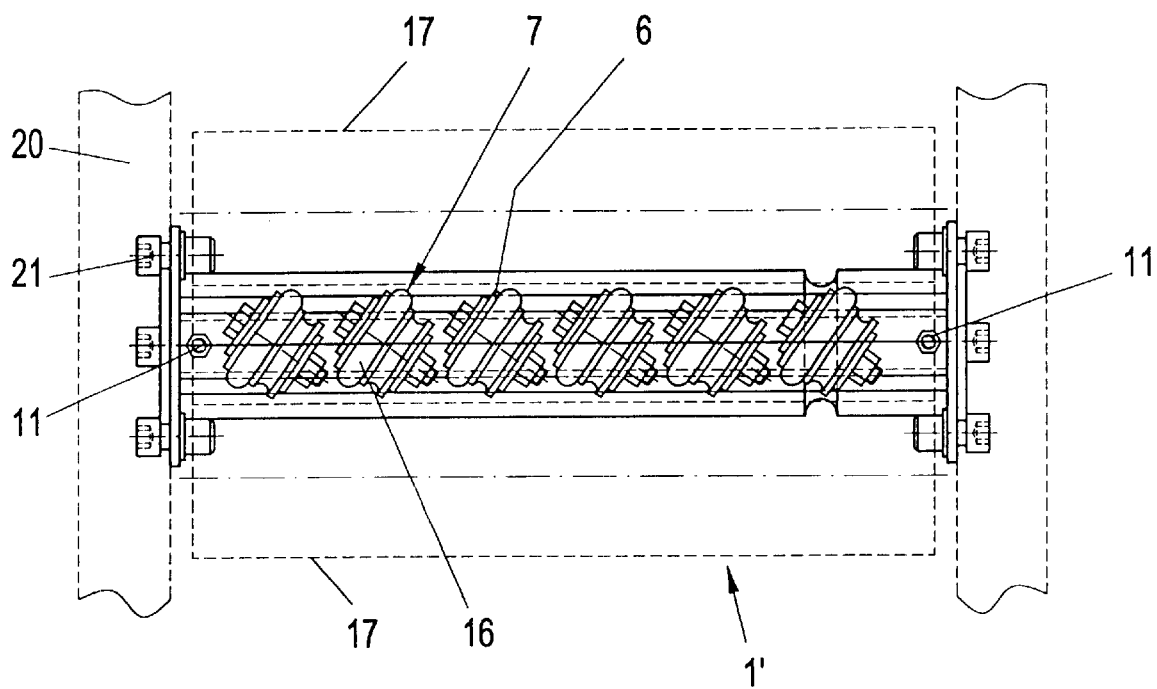
FIG. 6 is a top view onto the deviation module element according to FIG. 5.
Figure 7:
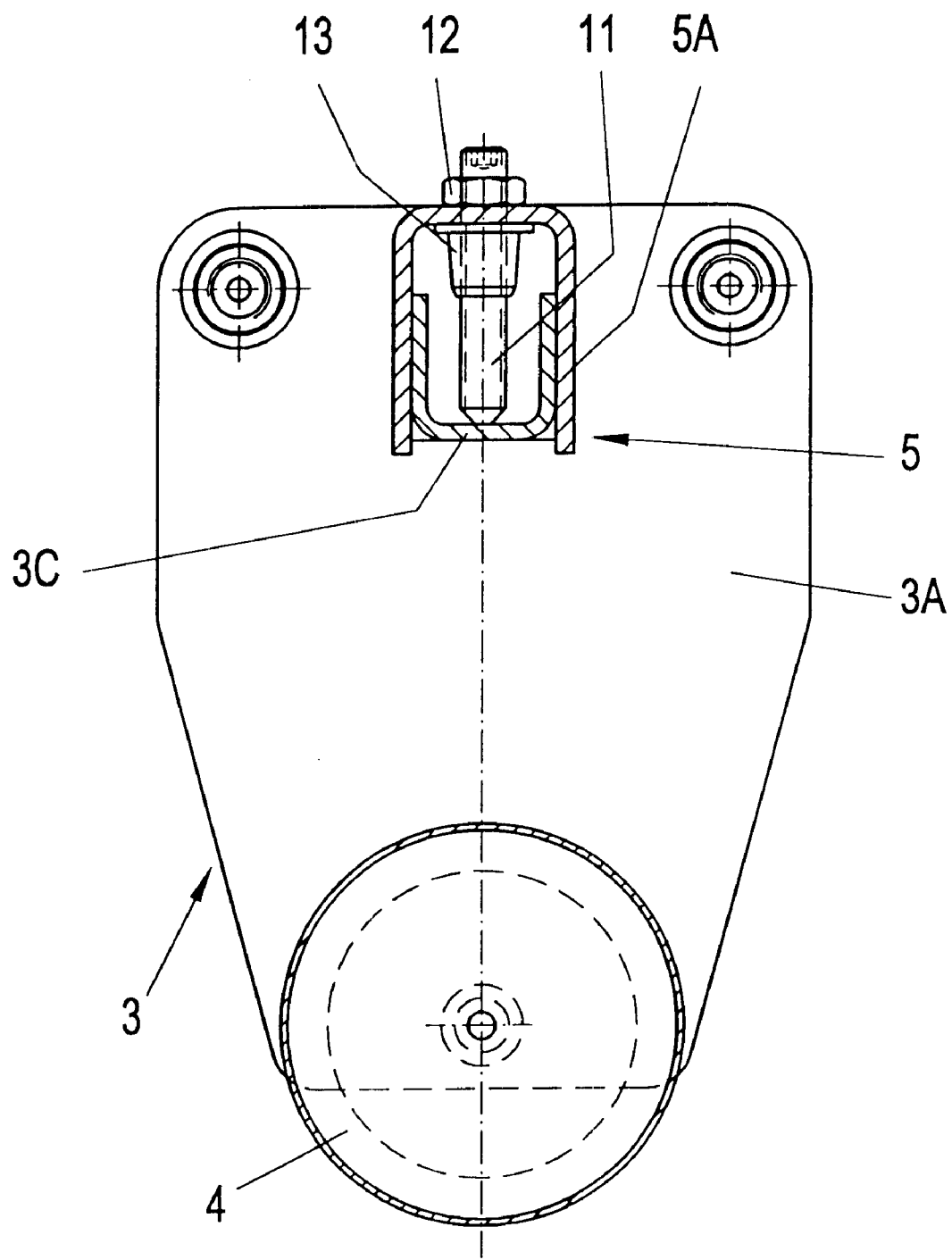
FIG. 7 is a cross-section of this deviation module element according to line VII—VII of FIG. 5.

In FIGS. 5, 6 and 7, a modified deviation module element 1' is shown which largely corresponds to that according to FIGS. 1 to 3, wherein, however, the lifting drive 2 with the basic carrier 3B between the lower driving roller 4 and the upper, vertically adjustable carrier 5 has been omitted. In particular, again a row of rollers 7 rotatably mounted in yoke-shaped holding elements 6 is fixed in the described manner, by means of the afore-mentioned screw bolts 8, on carrier 5, more precisely, on the upper carrier section 5A thereof. Now, however, the carrier 5 is adjusted such in terms of its height by aid of the bolts or screws 11 at its ends that the rollers 7 with their upper side, i.e. the upper edge of the O-rings not illustrated in detail in FIG. 5, yet cf. FIG. 4, lie in the conveying plane; this plane of the upper edges of the O-rings 16 of the rollers 7, or conveying plane, respectively, is schematically illustrated at 22 both in FIG. 5 and in FIG. 1 and corresponds to the upper edge of the carrying rollers 17. The height adjustment mechanism comprising the screw 11 and the nuts 12, 13 screwed thereto may be simplified as compared to FIG. 3, since the row of rollers with the carrier 5 is not to be lifted or lowered during operation and during control.

Figure 8:
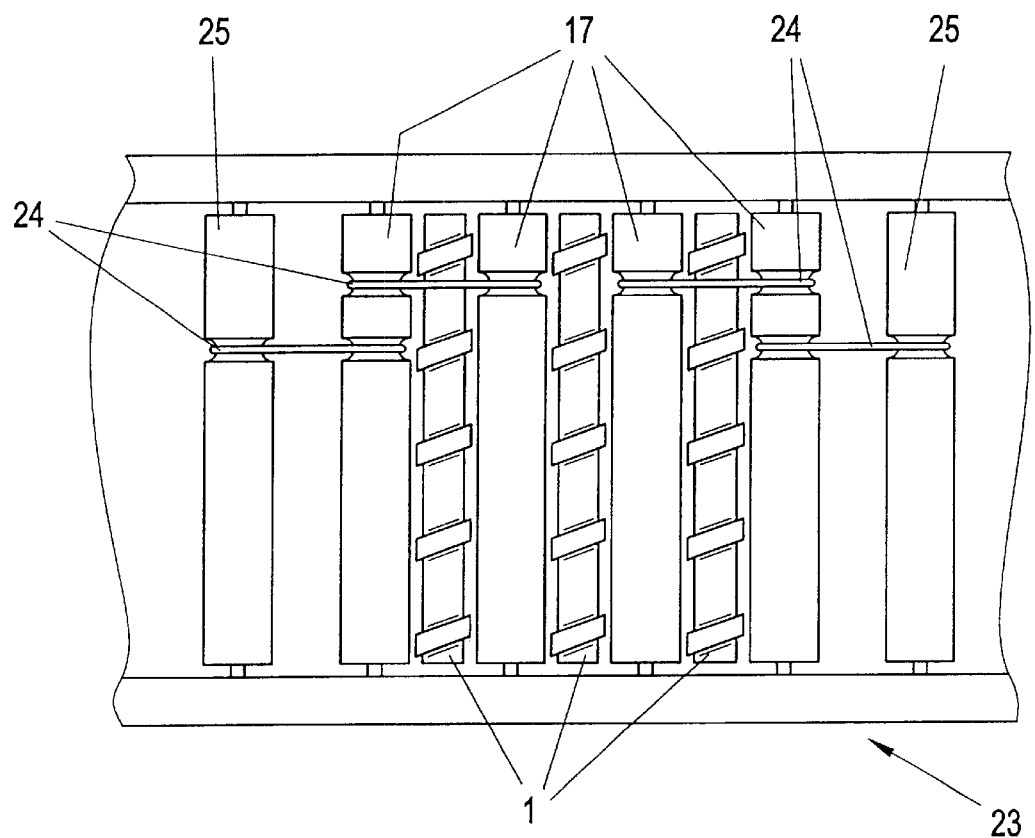
FIG. 8 is a schematic partial top view onto a driving roller path comprising three deviation module elements.

FIG. 8 shows a driving roller path 23 as an example of a conveying means, wherein three deviation module elements 1 are each arranged between two carrying rollers 17 of the driving roller path 23. The driving rollers 17 which are arranged immediately adjacent the deviation module elements 1 have the form of bead rollers so as to allow for a safe drive via round belts 24. The remaining driving rollers 25 are driven by a flat belt 26 (cf. FIG. 9) which simultaneously drives the driving rollers 4 of the deviation module elements 1.

Figure 9:
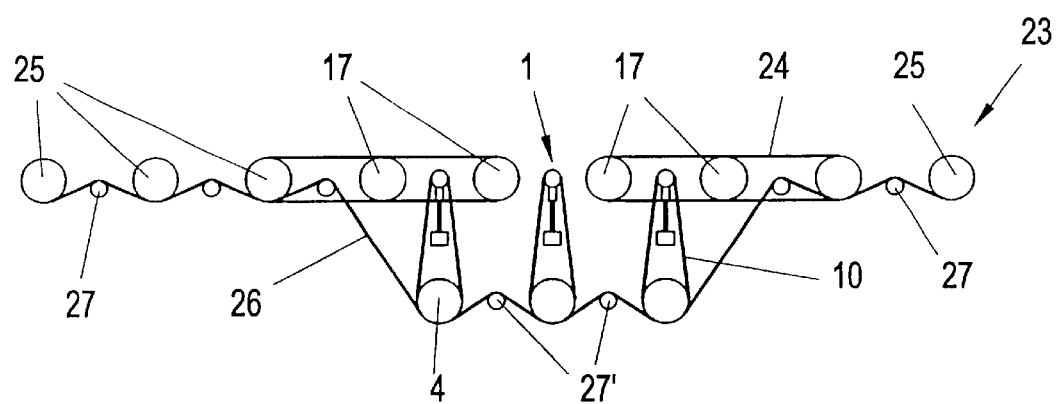
FIG. 9 is a schematic longitudinal section through this driving roller path comprising three deviation module elements.

In FIG. 9, the driving roller path 23 comprising the three deviation module elements 1 is shown in a rather schematic longitudinal section. The course of the flat belt 26 can be seen. In the regions of the driving roller path 23 in which no module elements 1 are provided, one tensioning or deflection pulley each is arranged between two driving rollers 25, forcing the flat belt 26 to take a course such that a sufficient pressing force of the flat belt 26 on the lower circumferential side of the driving rollers 25 will be present to drive the latter and to prevent slippage. In those regions in which the deviation module elements 1 are provided in the driving roller path 23, the flat belt 26 is guided downwards to the respective driving rollers 4 of the deviation module elements 1. Between the driving rollers 4 of the deviation module elements 1 again tensioning, or deflection pulleys 27, respectively, are provided so as to attain the looping angle of the flat belt 26 around the driving rollers 4 required for the frictional drive. The driving rollers 17 of the driving roller path 23 which neighbour the deviation module elements 1 and thus cannot be driven by the flat belt 26 are, as mentioned before, designed as bead rollers and are driven via the round belts 24 by the most closely located driving rollers 25 which are driven by the flat belt 26.

In FIG. 10, the use of three deviation module elements 1 in a driving roller path 23 is illustrated, in which the conveyed goods are transferred via a path 23B inclined by approximately 30° relative to the original conveying direction, and from there to a parallel conveyor 23A, cf. also the conveying directions indicated in FIG. 10 by arrows entered in full lines. The arrangement shown may, however, also be used to introduce conveyed goods from the conveying path 23A into a flow of conveyed goods on the conveyor 23, into spaces between individual conveyed articles on the conveyor 23, as is indicted by the arrows entered in broken lines in FIG. 10. If no such removal or introduction of conveyed articles is intended, the rollers 7 of the individual rows of the deviation module elements 1 are lowered as has been previously described by way of FIGS. 1 to 3 so that the upper rim of the O-rings 16 of the rollers 7 comes to lie below the conveying plane 22 (FIG. 1).

FIG. 11 shows the use of, e.g., three deviation module elements 1 for transferring conveyed goods onto a conveying path 23C extending in parallel to the original conveyor 23. There, the use of one (to three) trigger light barriers 28 for controlling the lifting drives 2, e.g. a lifting cylinder or the like (cf. FIG. 1) is provided. Each deviation module element 1 has its separate lifting drive 2, and it is possible to control all the deviation module elements 1 at once so as to lift the rollers 7 and to move out the conveyed goods, yet it is also possible to appropriately control one deviation module element 1 after the other one via separate trigger light barriers 28, thereby allowing for an increased throughput. The lifting drives 2 of successive deviation module elements 1 may, moreover, also be controlled by a single trigger light barrier 28—with the respective temporal delay, which will be adapted to the conveying speed. Moreover, it is advantageous if the driving rollers 29 of the parallel conveying path 23 have a rubber coating so as to allow for an additional drawing off of the conveyed goods.

Similarly, preferably also at least the inclined driving rollers 30 of the inclined conveying path 23B of FIG. 10 are rubber-coated.

In FIG. 12, a top view onto a driving roller path 23 is shown in which the use of deviation module elements 1 for deviating the conveyed goods by 90° and for moving them off to a conveying path 31 extending at right angles to the original conveying path 23 is shown. In particular, FIG. 12 shows that successively arranged deviation module elements 1 need not have the same inclined position. Thus, in this exemplary embodiment it is shown that the inclination at site 32 is less than that at site 33 which, in turn, is less than that at site 34, so as to achieve an overall smooth, gradual deviation of the conveyed goods. Moreover, it is also possible to provide deviation module elements 1 in the driving roller path 31 to which the conveyed goods are transferred, as is provided at site 35. Here it is also conceivable to insert, at sites 32, 33 and 34, deviation module elements 1' comprising rollers 7 whose height is fixedly adjusted.

FIG. 13 shows, in a top view, the use of deviation module elements 1 for shifting the conveyed goods towards one or the other longitudinal side of the driving roller path 23. This is often the case if the conveyed goods must have a certain minimum distance towards one side, e.g. for detecting a bar code or the like provided on the conveyed goods, and/or if products of different widths are conveyed. On that longitudinal side towards which the conveying goods are shifted, optionally an additional stop device 36, e.g. a rail, is provided.

FIG. 14 schematically illustrates a 90° curve realized with the assistance of deviation module elements 1. In this instance, a feeding driving roller path 23 comprising driving rollers 25 is followed at right angles by a driving roller path 37 further conveying the conveyed goods, and in the curve region 38, deviation module elements 1 are arranged on the driving roller path 23, on the one hand, and on the driving roller path 37, on the other hand. With a view to the fact that in this instance a solid curve is to be realized for the conveyed goods, it is, of course, also possible to instal deviation module elements 1' with rollers arranged at a fixed level (cf. FIGS. 5 to 7). In the curve region 38, a stop and guide rail 39 may additionally be provided at the curve outer side.

In FIG. 15 it is shown that the "curve" according to FIG. 14 may be further developed into a "180° turn", realized with the assistance of the module elements 1, and 1', respectively. Preferably, at least the deviation module element arranged longitudinally aligned between the two conveying paths 23 and 37' should be modified, as it must be driven via separate belts from the other deviation module elements 1' within the driving roller path 23 or 37'. Moreover, again a delimiting and guiding rail 39' is provided in the region of the turn.

In FIG. 16, a further development of the arrangement according to FIG. 11 is shown, wherein the conveyed goods are transferred by shifting them from the one driving roller path 23 to a driving roller path 23C extending in parallel thereto. By the fact that a longitudinally arranged deviation module element 1, and 1', respectively, is again arranged between the two driving roller paths 23, 23C, the conveyed goods pushed off the driving roller path 23 by the deviation module elements 1 installed there—with the appropriate alignment of the rollers schematically indicated in FIG. 16—can be turned about their vertical axes, i.e. by 180°, so that then they will be moved on on the driving roller path 23C with their original rear side turned forwards, cf. also the arrows in FIG. 16.

Moreover, according to FIG. 17, a 90° transfer from a driving roller path 23 to a driving roller path 23C arranged in parallel thereto may also be effected with the assistance of rollers adjusted under 90° relative to the conveying direction provided on installed deviation module elements 1, wherein in this connection it has also been indicated in FIG. 17 that between the two driving roller paths 23, 23C, again a longitudinally arranged deviation module element 1, or 1', respectively, may be present so as to help push off the conveyed goods. In this case, both the rollers of the deviation module element 1 in the driving roller path 23 and the rollers of the longitudinally arranged deviation module element 1, or 1', respectively, between the two driving roller paths 23, 23C are adjusted such that their axes of rotation extend in parallel with the conveying direction 9, i.e. the rollers have an angle of 90° relative to the conveying direction 9.

In FIGS. 18, 19, a modified deviation module element 1" is shown which largely corresponds to that according to FIGS. 1 to 3, wherein, however, respective additional deviation rollers 40 are provided between two deflection pulleys 7' so that the round belts 10 will not touch the carrier 5. The deviation rollers 7' have a groove 42 on both peripheral outer sides so as to guide the round belts 10, which also come to rest on the lower peripheral part 43 of the deflection pulleys 40 and thus are deflected.

Finally, according to FIG. 20, a 90° transfer from one driving roller path 23 to another driving roller path 23C extending in parallel thereto may also be effected with the assistance of rollers provided on installed deviation module elements 1" adjusted under 90° relative to the conveying direction, the deviation module elements 1" being installed in parallel to the remaining driving rollers. In this connection it is indicated similarly as in FIG. 17 that, again, a longitudinally arranged deviation module element 1, or 1', respectively, may be provided between the two driving roller paths 23, 23C so as to help push off the conveyed goods.

What is claimed is:

1. A deviation device (1; 1') for a conveyor for deviating conveyed goods, said conveyor defining a conveying plane and including a basic frame (20), said deviation device (1; 1') comprising drivable deviation rollers (7) attached to a common carrier (5) which is adjustable in terms of height by means of a substantially vertically operating lifting device (2) for respective lifting and lowering of the common carrier (5), said lifting device being mounted on a basic carrier (3B), wherein said common carrier (5), with said deviation rollers (7) arranged in a row thereon, a driving roller (4) associated with the deviation rollers (7), and said basic carrier (3B) fixed underneath the common carrier (5) and in-between the common carrier (5) and the driving roller (4)

together are arranged in a separate module frame (3) adapted to be connected to the basic frame (20) of the conveyor, said separate module frame (3) together with said common carrier (5) and the deviation rollers (7), with said driving roller (4), with said basic carrier (3B) and the lifting device (2) forming a separate module.

2. A deviation device according to claim 1, characterized in that a driving roller path is provided as conveyor.

3. A deviation device according to claim 2, characterized in that a drive belt (26) is provided for the drive of the driving roller (4), which drive belt also drives the driving rollers (25) of the driving roller path (23).

4. A deviation device according to claim 3, characterized in that a flat belt is provided as the drive belt (26).

5. A deviation device according to claim 1, chracterized in that at least one lifting cylinder is provided as the lifting drive (2) for a respective lifting and lowering of the carrier (5) comprising the row of rollers, which lifting cylinder is fastened to the basic carrier (3B) that is fixed to the module frame (3).

6. A deviation device according to claim 1, characterized in that a round belt drive is provided for the rollers (7), each round belt (10) running over a roller (7) as well as over the driving roller (4) rotatably mounted in the module frame (3).

7. A deviation device according to claim 1, characterized in that the rollers (7) comprise an O-ring (16) on their periphery.

8. A deviation device according to claim 1, further comprising carrying rollers (17) neighboring the deviation device (1;1'), said carrying rollers (17) being bead rollers which are driven via round belts (24).

9. A deviation device according to claim 1, characterized in that the end positions of the carrier (5) are defined by adjustable stops (3C) connected with the module frame (3).

10. A deviation device according to claim 1, characterized in that several deviation module elements (1) comprising carriers (5) arranged to be adjustable in terms of height independently of each other are provided in separate module frames (3).

11. A deviation device according to claim 1, characterized in that the or each deviating device (1) has an associated trigger light barrier (28) for controlling the lifting drive (2) of the carrier (5).

12. A deviation device according to claim 1, characterized in that a common trigger light barrier (28) is provided for an optionally temporally consecutive control of the lifting drives (2) of the carriers (5) of several deviation devices (1).

13. A deviation device according to claim 1, characterized in that the rollers (7) are arranged on the carrier (5) so as to be rotatable about axes extending perpendicularly to their axes of rotation and thus are adjustable under adjustable angles.

14. A deviation device according to claim 1, characterized in that the rollers (7) in a normal operating position have an angle of approximately 35° relative to the conveying direction (9).

15. The use of a deviation device according to claim 1 for moving out or introducing the conveyed goods via a conveying path (23B) extending inclinedly relative to the driving roller path (23).

16. The use of a deviation device according to claim 1, for shifting the conveyed goods onto a roller path (23C) extending in parallel to the original driving roller path (23).

17. The use of a deviation device according to claim 1, for pushing off or introducing the conveyed goods in a direction extending substantially at right angles relative to the conveying direction (9), of the driving path (23).

18. The use of a deviation device according to claim 1, for shifting the conveyed goods towards a certain longitudinal side of the driving roller pat (23).

19. The use of a deviation device according to claim 18, wherein a stop device (36) is provided on that longitudinal side towards which the conveyed goods are shifted.

20. The use of a deviation device according to claim 19, wherein a rail is provided as the stop device (36).

21. The use of a deviation device according to claim 1, for forming a curve region (38) as a transition between two conveying paths (23, 37, and 37', respectively) arranged under an angle relative to each other.

22. The use of a deviation device according to claim 21, characterized in that the conveying paths (23, 37) are arranged under an angle of 90° relative to each other.

23. The use of a deviation device according to claim 21, characterized in that the conveying paths (23, 37) are arranged under an angle of 180° relative to each other.

24. The use of the deviation device according to claim 1, for turning the conveyed goods by 180° about their vertical axes, wherein a deviation device (1; 1') is arranged with its carrier in parallel to the main conveying direction (9) between two parallel conveying paths (23, 23C).

* * * * *

UNITED STATES PATENT AND TRADEMARK OFFICE
CERTIFICATE OF CORRECTION

PATENT NO. : 6,648,121 B2
DATED : November 18, 2003
INVENTOR(S) : Karl Freudelsperger It is certified that error appears in the above-identified patent and that said Letters Patent is hereby corrected as shown below:

<u>Title page,</u>
Item [22], PCT Filed:, delete "Jul. 10, 2001" and insert -- Jul. 10, 2000 --.

Signed and Sealed this

First Day of June, 2004

JON W. DUDAS
*Acting Director of the United States Patent and Trademark Office*